(12) United States Patent
Weyland

(10) Patent No.: US 7,661,280 B1
(45) Date of Patent: Feb. 16, 2010

(54) LOCKING DEVICE

(76) Inventor: Trevor Adrian Weyland, 2251 Webster St., San Francisco, CA (US) 94115

( * ) Notice: Subject to any disclaimer, the term of this patent is extended or adjusted under 35 U.S.C. 154(b) by 0 days.

(21) Appl. No.: 12/287,954

(22) Filed: Oct. 15, 2008

Related U.S. Application Data

(60) Provisional application No. 60/999,347, filed on Oct. 17, 2007.

(51) Int. Cl.
*B62H 5/00* (2006.01)
(52) U.S. Cl. .............. 70/233; 70/14; 70/18; 70/30; 70/49; 224/425
(58) Field of Classification Search ............ 70/14, 70/18, 19, 30, 49, 233; 224/425, 935
See application file for complete search history.

(56) References Cited

U.S. PATENT DOCUMENTS

| | | | | |
|---|---|---|---|---|
| 3,529,451 | A | * | 9/1970 | McOsker et al. ............... 70/59 |
| 3,782,146 | A | | 1/1974 | Franke |
| 3,910,081 | A | | 10/1975 | Pender |
| 4,028,916 | A | | 6/1977 | Pender |
| 4,065,945 | A | | 1/1978 | Jaulmes |
| 4,223,542 | A | | 9/1980 | Basseches |
| 4,274,271 | A | | 6/1981 | Todd |
| 4,404,822 | A | * | 9/1983 | Green ........................ 70/233 |
| 5,018,374 | A | * | 5/1991 | Montano .................... 70/233 |
| 5,291,765 | A | * | 3/1994 | Hoisington ................. 70/233 |
| 5,718,134 | A | * | 2/1998 | Chang ....................... 70/233 |
| 5,791,170 | A | | 8/1998 | Officer |
| 5,889,463 | A | * | 3/1999 | Judd et al. ................. 340/427 |
| 6,227,016 | B1 | | 5/2001 | Yu |
| 6,536,246 | B2 | | 3/2003 | Wilson |
| 6,609,399 | B1 | | 8/2003 | Daniels |
| 6,629,440 | B1 | | 10/2003 | Meekma |
| 6,698,257 | B2 | | 3/2004 | Kulas |
| 6,923,027 | B1 | | 8/2005 | Kuo |
| 7,159,423 | B1 | | 1/2007 | Mrdeza |

OTHER PUBLICATIONS www.boltlockcorp.com, website home page, website page "How the Bolt Lock Works", printed Oct. 10, 2008 in San Francisco. Note reference to "patent pending".

* cited by examiner

*Primary Examiner*—Suzanne D Barrett

(57) ABSTRACT

One embodiment of a locking device of the type for motorcycle helmets having a cable (50) which is fastened at one end to the device, and which passes though the face of the helmet and is detachably secured in the locking device to releasably secure the helmet. The active locking element of the lock (44), when in locked position, secures the cable (50) and acts to deny access to the fastener (36) securing the device to the motorcycle handlebars, so as to resist removal of the device from the handlebars. The cable (50) is flexible, has permanently formed spiral convolutions and is partially held in place by the concave shape of the device. The device can be used to secure helmets, jackets or other items, and, in various embodiments, it can be used to lock a vehicle or item to a fixed object to deter theft of the vehicle or item. Other embodiments are described and shown.

8 Claims, 7 Drawing Sheets

LOCKING DEVICE

CROSS REFERENCE TO RELATED APPLICATION

Figure 1:
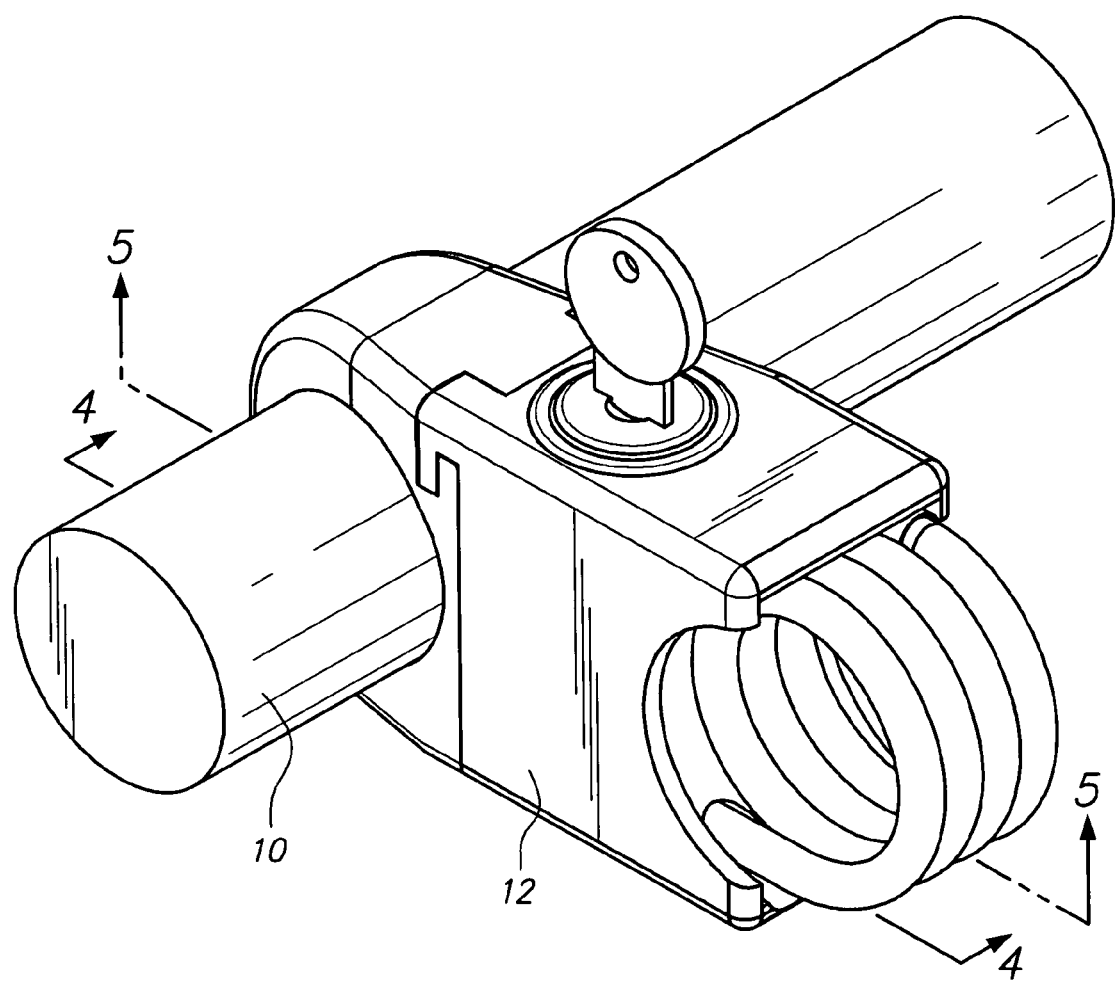

This application claims the benefit of PPA Ser. No. 60/999,347, filed 2007 Oct. 17 by the present inventor, which is incorporated by reference.

US PATENT REFERENCES

U.S. Pat. No. 3,782,146

U.S. Pat. No. 3,910,081

U.S. Pat. No. 4,028,916

U.S. Pat. No. 4,065,945

U.S. Pat. No. 4,233,542

U.S. Pat. No. 4,274,271

U.S. Pat. No. 5,791,170

U.S. Pat. No. 6,227,016

U.S. Pat. No. 6,536,246

U.S. Pat. No. 6,609,399

U.S. Pat. No. 6,629,440

U.S. Pat. No. 6,698,257

U.S. Pat. No. 6,923,027

U.S. Pat. No. 7,159,423

FEDERALLY SPONSORED RESEARCH

Not Applicable

SEQUENCE LISTING OR PROGRAM

Not Applicable

BACKGROUND

1. Field of Invention

This invention relates to security devices, specifically to a lock for securing a helmet to a motorcycle.

2. Prior Art

The present invention relates to a tamperproof device for locking items to a handlebar or frame of a personal vehicle, or, alternatively, for retaining a handlebar or frame to another object. In particular, the present invention relates to a device which is particularly suitable for holding a motorcycle helmet to the handlebar of a motorcycle, or, alternatively, for locking a vehicle to a fixed item, to prevent it from being moved.

Motorcycle helmets are bulky and it is desirable to secure them to the motorcycle when arriving at a destination, rather than having the inconvenience of carrying them about at the destination point. However, helmets may be the target of thieves.

Motorcycles are typically supplied by the manufacturer either without a helmet lock or with a helmet lock that leaves the helmet vulnerable to theft. Accessory helmet locks have partially addressed this problem but these have significant problems.

Prior art uses metal cables or chains with a lock to allow a rider to secure the helmet to a part of the motorcycle. However, these approaches require a motorcycle rider to carry a heavy and cumbersome cable or chain and lock. Carrying such a chain and lock on the rider's person additionally presents a safety risk to the rider in the event of an accident, when the chain or lock may be trapped between the rider's body and the ground or other point of impact.

Another prior art approach allows helmets to be locked in compartments, such as side bags or cases that are mounted to the motorcycle. However, not all motorcycles have such devices and these devices are large and tend to detract from a motorcycle's performance and aesthetic beauty.

Another approach uses a lock that is either integrated into the motorcycle or added as an accessory. Usually this is a small lock operable with a key. The lock has a tiny arm that goes through a D ring buckle on a cloth strap on the motorcycle's helmet. However, the helmet is quite easily removed from this type of helmet lock by simply cutting the strap with a knife. A lock of the foregoing character is illustrated, for example, in U.S. Pat. No. 7,159,423 to Mrdeza which describes a lock in which a locking bolt advances through the strap ring to secure the helmet. Unfortunately, this leaves the helmet strap vulnerable to being cut.

A further approach is to use an accessory lock that is attached to the motorcycle by means of screws or bolts. However such screws and bolts are vulnerable to being unscrewed or unbolted. For example, U.S. Pat. No. 4,028,916 to Pender describes a device in which a locking unit is attached to a bicycle frame member. Unfortunately, the locking unit is secured to the bicycle frame using a strap that is bolted around the frame but the bolt is not protected and therefore may simply be unbolted.

A still further approach is to use a locking mechanism in which the lock is secured to the motorcycle by means of a bolt (either an existing one or a longer replacement one) to hold the lock in place. The lock then receives both ends of a separate cable for use in securing the helmet, covering the bolt. Unfortunately, the cable remains a separate accessory in this instance, to be carried separately.

A lock which attaches to the end of a handlebar grip is described in U.S. Pat. No. 6,536,246 to Wilson. The lock attaches to the end of the handlebar using an expandable hub which is expanded within a tubular handlebar end, and a "shackle, a cable, or a spring loaded lever which extends out of the distal end of the handlebar." Unfortunately, by extending from the handlebar, the lock is vulnerable to cutting or breaking and compromises the safety of the motorcycle by widening the handlebars.

U.S. Pat. No. 7,159,423 to Mrdeza takes a similar approach, widening the handlebars, or the foot pegs, making the motorcycle more cumbersome and potentially less safe. Similarly, U.S. Pat. No. 6,698,257 to Kulas describes a securing member 120 which is attached to the end of a handlebar grip and which again widens the motorcycle.

U.S. Pat. No. 4,274,271 to Todd describes a device for locking an article to a construction such as a handlebar. Unfortunately, this device requires modification to the article to be secured, including drilling through the helmet and potentially compromising its safety.

In view of the foregoing, there exists a need for a device which itself locks securely to the handlebar, and incorporates a cable, and secures the helmet by passing a cable through the open face of the full face helmet rather than relying on the D ring and vulnerable strap to provide strength, and which does not widen the motorcycle handlebar or foot pegs.

SUMMARY

In accordance with one embodiment, a locking device comprises a cable which is fastened at one end to the device, and which passes though the face of the helmet and is detachably secured in the lock to releasably secure the helmet. The plunger or active locking element of the lock, when in locked position, acts to deny access to the fasteners securing the device to the motorcycle handlebars, so as to resist removal of the device from the handlebars. The cable is flexible, has permanently formed spiral convolutions and is partially held in place by the concave shape of the device. The device can be used to secure helmets, jackets or other items, and, in various embodiments, it can be used to lock a vehicle or item to a fixed object to deter theft of the vehicle or item.

DRAWINGS

Figures

Figure 2:
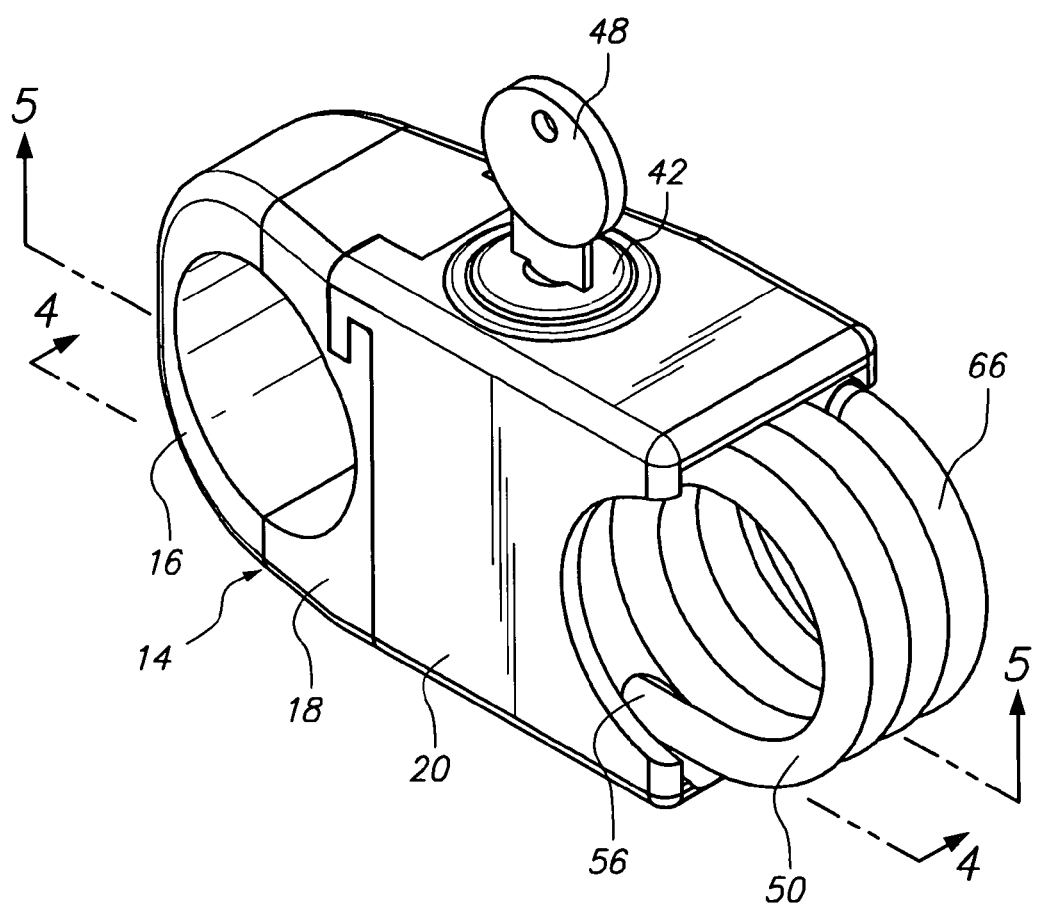
Figure 3:
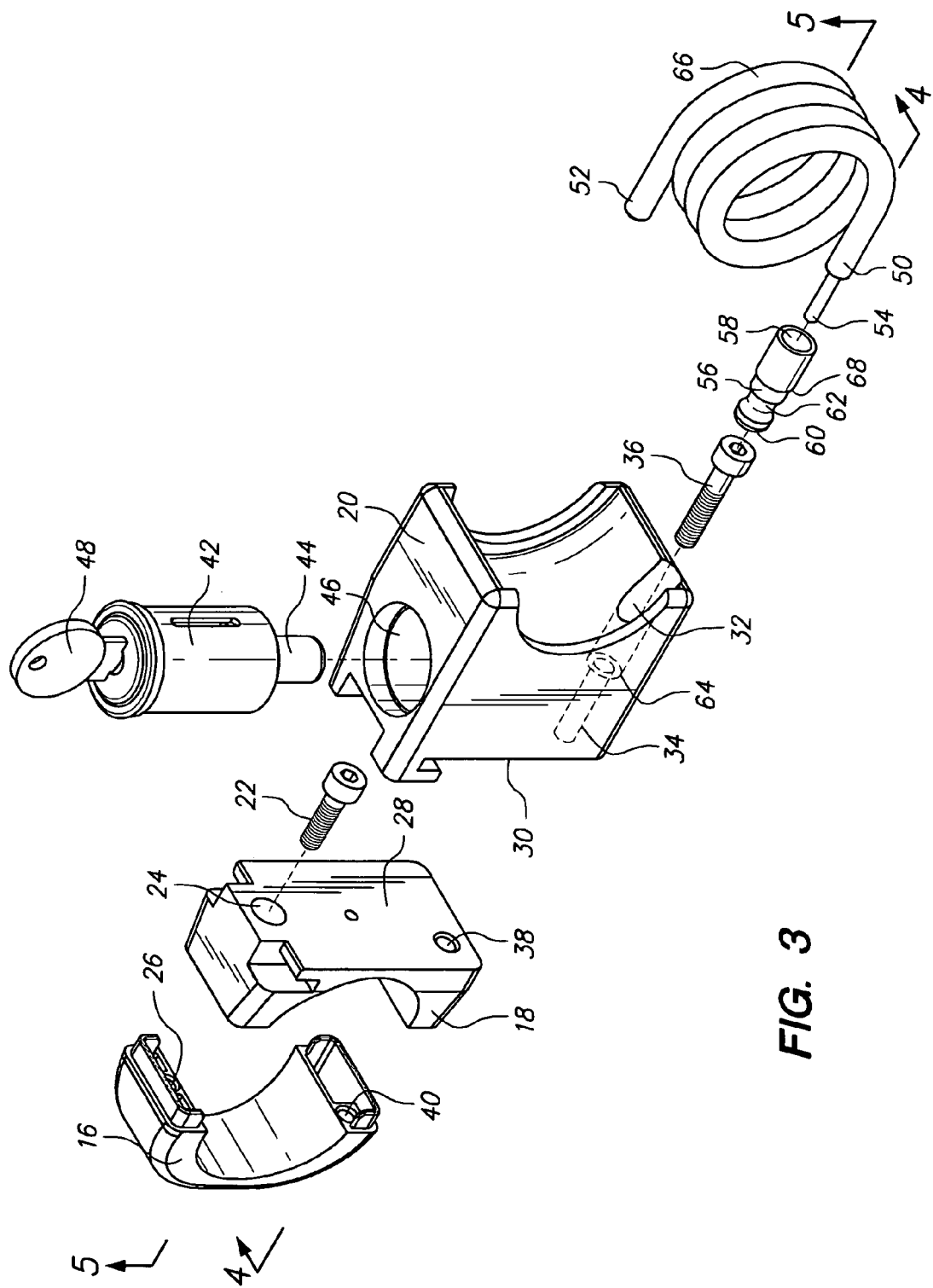
Figure 4:
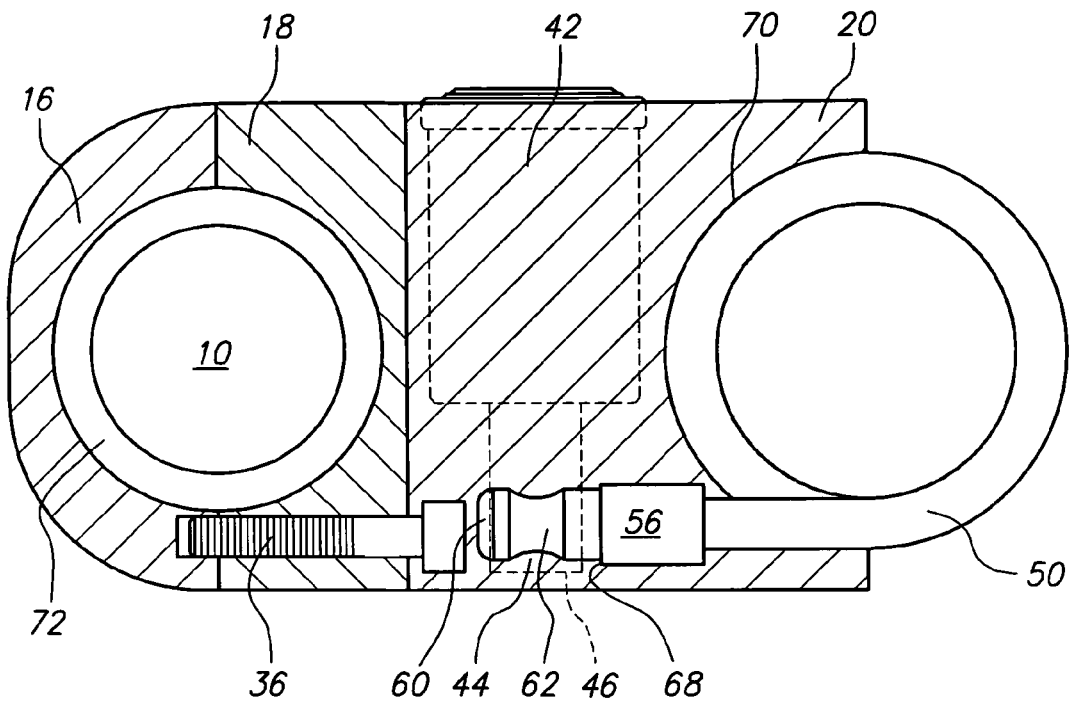
Figure 5:
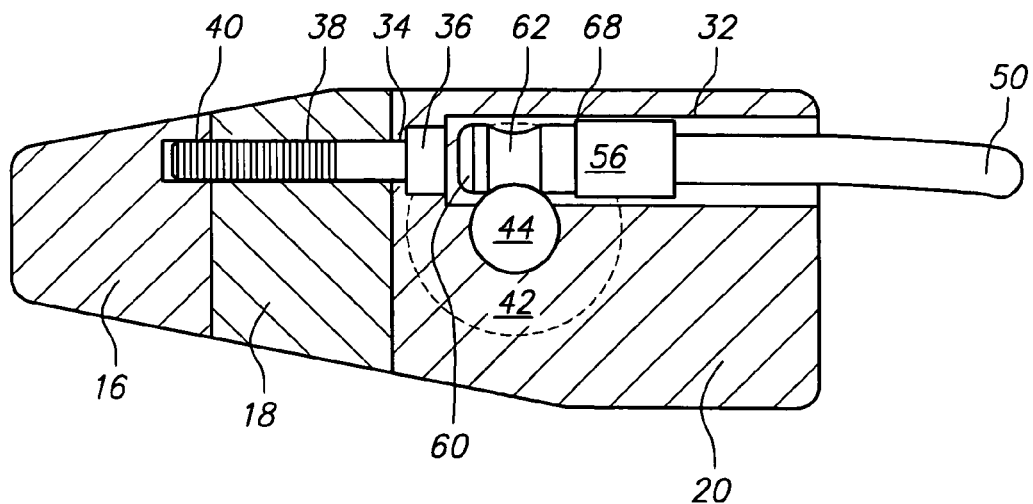
Figure 6:
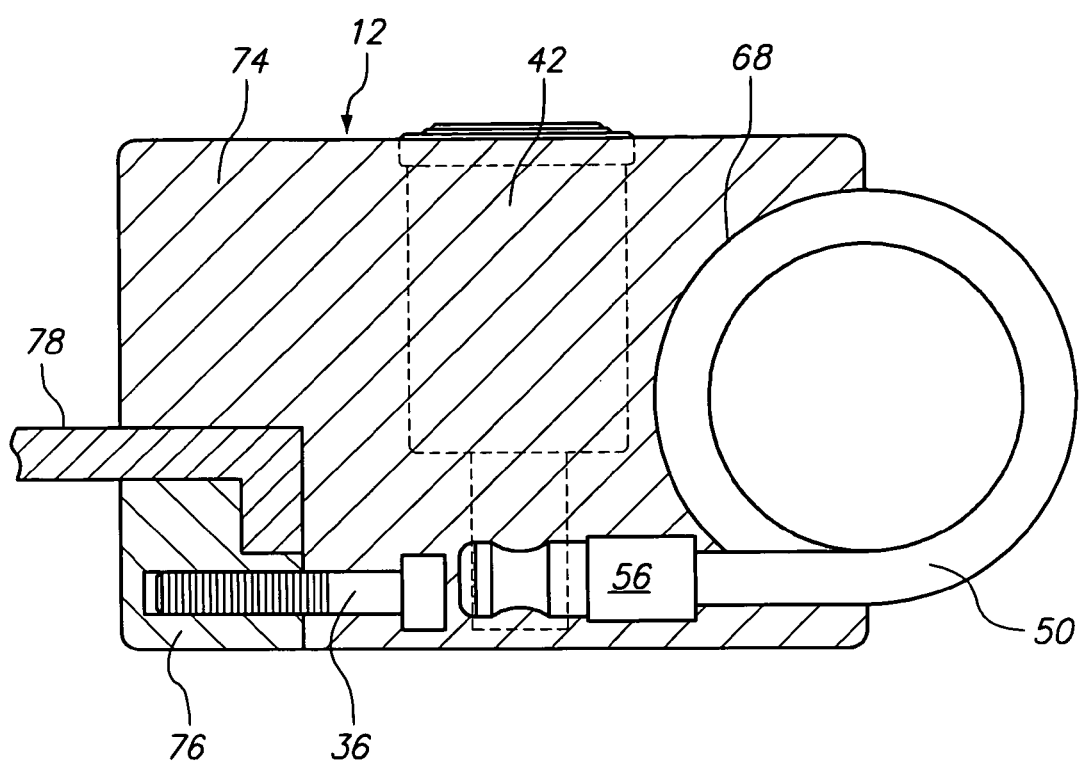
Figure 7:
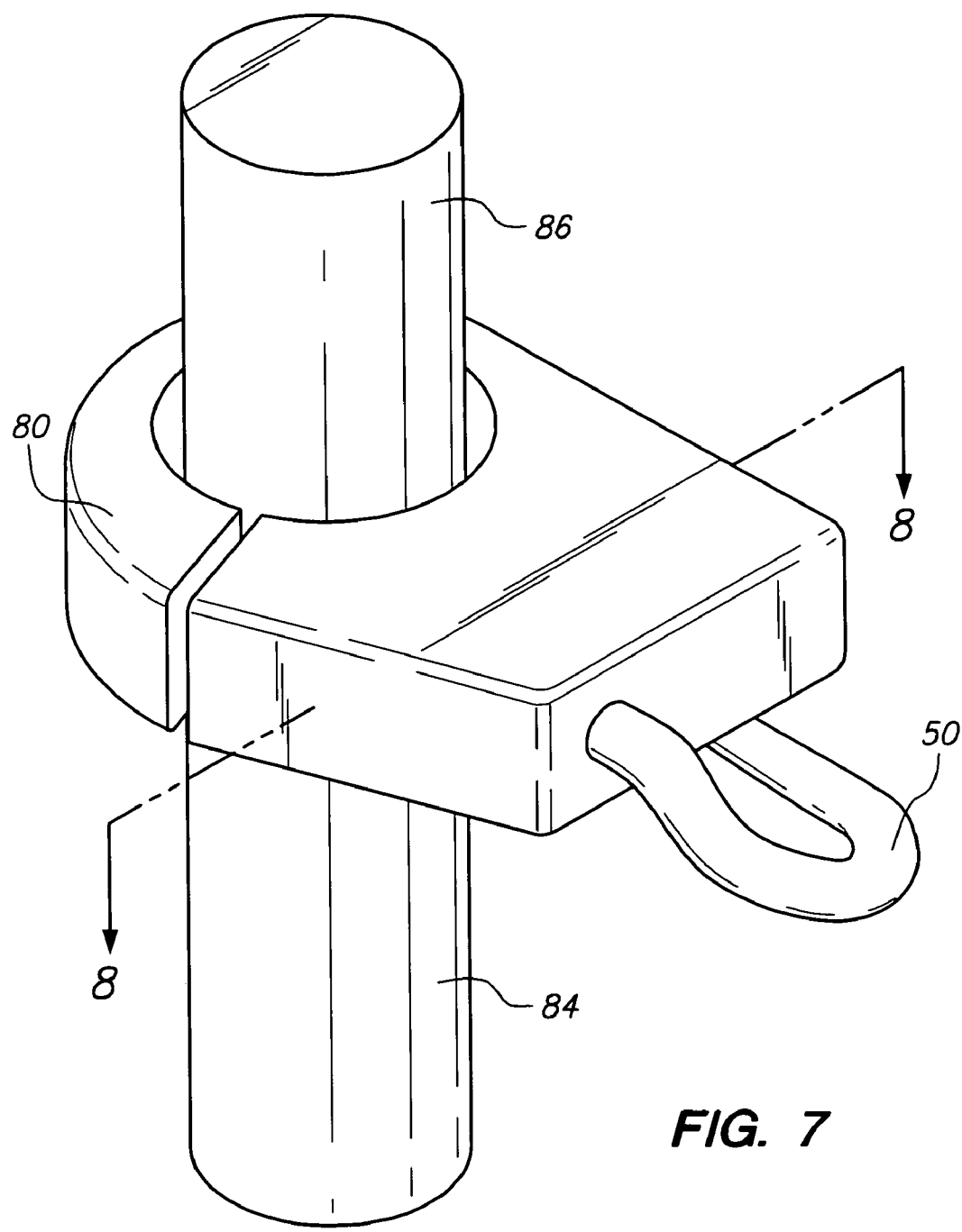
Figure 8:
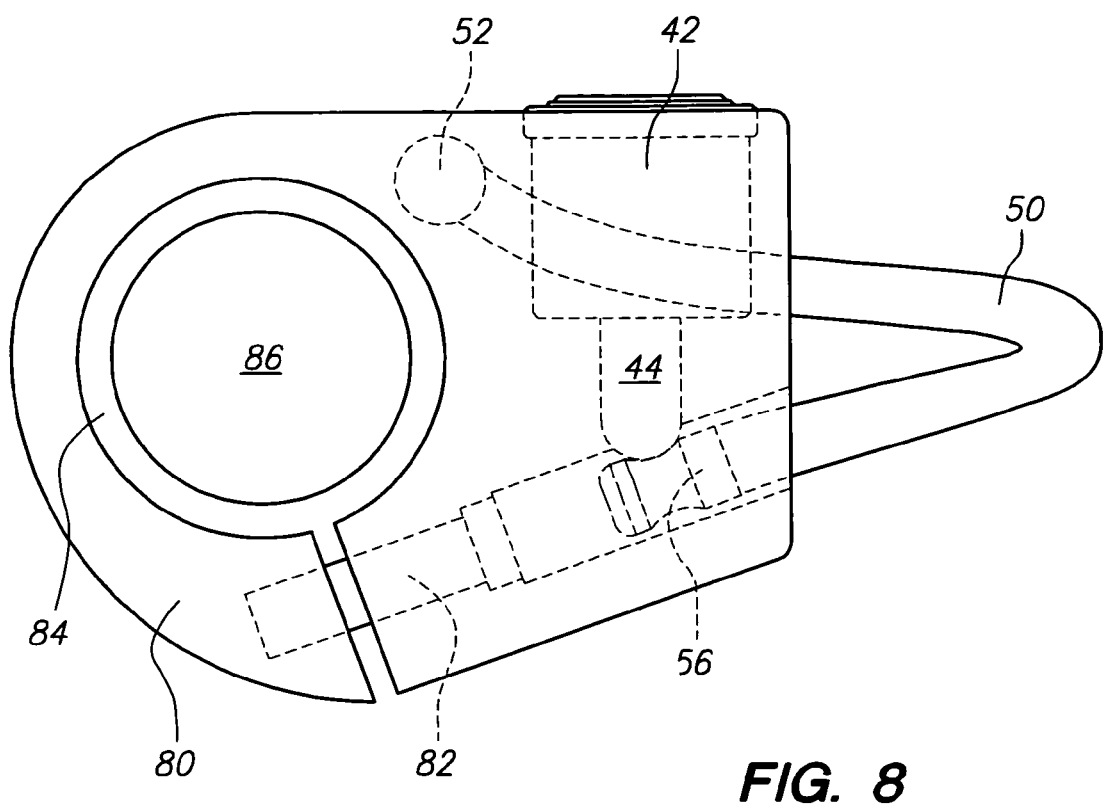

FIG. 1 is a perspective view of one embodiment.
FIG. 2 is a perspective view of one embodiment.
FIG. 3 is an exploded perspective view of one embodiment.
FIG. 4 is a side view of one embodiment.
FIG. 5 is a cross sectional view of the locking device taken along line 4-4 in FIGS. 1 & 2.
FIG. 6 is a side view of one embodiment.
FIG. 7 is a perspective view of one embodiment.
FIG. 8 is a cross sectional view of the lock taken along line 8-8 in FIG. 7.

DRAWINGS

Reference Numerals

10 Handlebar
12 Helmet lock
14 Lock housing
16 Bar end section
18 Center section
20 Lock section
22 Threaded fastener
24 Receiver bore
26 Receiver bore
28 Face
30 Face
32 Receiver bore
34 Receiver bore
36 Threaded fastener
38 Receiver bore
40 Receiver bore
42 Lock mechanism
44 Plunger
46 Receiver bore
48 Key
50 Cable
52 Cable end
54 Cable free end
56 Locking pin
58 Distal end
60 Head
62 Shoulder
64 Shoulder
66 Cable spiral convolutions
68 Shoulder
70 Face of lock section
72 Resilient cushion element
74 Lock section
76 Triple clamp section
78 Triple clamp
80 Seat stem clamp
82 Fastener
84 Bicycle frame
86 Seat post

DETAILED DESCRIPTION

FIGS. 1-8

One embodiment of the locking device is illustrated in FIGS. 1-5.

A handlebar 10 and attached helmet Lock 12 are shown in FIG. 1.

Helmet lock 12 is shown in FIG. 2 (perspective view), FIG. 3 (exploded perspective view), FIG. 4 (side view) and FIG. 5 (cross sectional view).

As shown in FIG. 2, helmet lock housing 14 comprises three sections, bar end section 16, center section 18 and lock section 20.

As shown in FIGS. 3, 4 and 5, bar end section 16 and center section 18 are secured around handlebar 10 by threaded fastener 22 through bore 24 and into bore 26. Center section 18 and lock section 20 are lined up so that faces 28 and 30 abut. Lock section 20 is provided with a through receiver bore or passageway 32 that leads to narrower bore 34. Threaded fastener 36 is inserted through bores 32, 34 and 38 into bore 40 to secure the three sections 16, 18 and 20 of lock housing 14.

Lock section 20 is provided with a lock mechanism 42 having an active locking element projecting latch or cam element or plunger 44 which projects into receiver bore 46. An example of a lock mechanism suitable for use with this embodiment is lock part number 1630 available from ABA locks USA, San Dimas, Calif. However, the lock mechanism can consist of any other lock with an active locking element.

Plunger 44 is retracted from bore 46 by operation of key 48. However, lock mechanism 42 may be a combination lock or other locking unit.

Cable 50 has a first end 52 anchored to lock section 20. Cable 50 has a free end 54 to be introduced and engaged in bore or passageway 32. Cable free end 54 is secured to passive plug-in locking pin 56 by inserting cable free end 54 into distal end 58 of locking pin 56. Cable free end 54 carries locking pin 56 having a head 60 adapted to pass over and have its shoulder 62 lock behind plunger 44 within bore 32 when plunger 44 is introduced therein. Bore 32 incorporates a shoulder 64 which is mirrored in shoulder 68 in locking pin 56, permitting locking pin 56 to enter bore 32 precisely far enough for plunger 44 to engage with locking pin 56 as described in the preceding sentence.

Cable 50 is flexible, and can have plural permanently formed spiral convolutions 66 provided therein through most of its length whereby cable 50 is retained in a compact form when the lock is not in use. Further, in this embodiment, face 70 of lock section 20 is formed in a concave arc to partially hold cable 50 in place. However, face 70 of lock section 20 can be of any other shape.

As shown in FIG. 4, a resilient cushion element 72 may be intervened between handlebar
and bar end section 16 and center section 18 to accommodate and secure a smaller diameter handlebar. In the present embodiment, cushion element 72 is rubber. However, the cushion element can consist of any other material that can compress tightly between the handlebar and lock body.

Operation—FIGS. 1-5

It may now be seen in FIGS. 1-5 that the arrangement forms a secure and permanent mounting for helmet lock 12 on handlebar 10. This permits the motorcyclist to lock his helmet, and relieve him of carrying the helmet with him at the destination point.

Lock housing 14 is permanently secured around handlebar 10 by threaded fasteners 22 and 36. Cushion element 70 may be intervened between handlebar 10 and bar end section 16 and center section 18 to accommodate a smaller diameter handlebar. Lock mechanism 42 has an active locking means plunger 44 that, in bore 46, receives and cooperates with locking pin 56 on cable free end 54 of cable 50. Cable end 52 of cable 50 is permanently attached to lock section 20.

Cable 50 is looped through the face of the helmet prior to introducing locking pin 56 into bore 32 for locking engagement with plunger 44. This arrangement not only secures the cable and helmet, but also renders threaded fastener 36 inaccessible to tampering since locking pin 56 and cable free end 54 are positioned in bore 32 and plunger 44 is in locked position.

Further, threaded fastener 22 may not be accessed nor undone when lock section 14 is secured and faces 28 and 30 abut each other.

Fastener 22 can be accessed when cable 50 is not in bore 32 and plunger 44 is in unlocked position, thereby allowing lock section 20 to be separated from center section 18, further allowing access to undo fastener 22 so that center section 18 and bar end section 16 may be disengaged and lock 12 may be dismantled from handlebar 10.

Additional embodiments—FIGS. 6-8

The arrangement of locking means and cable is the same as described in the previous embodiment illustrated in FIGS. 1-5 and hence an explanation of its operation need not be repeated. The same reference numerals are used to denote corresponding parts.

In FIG. 6 lock 12 is attached to triple clamp 78 of a motorcycle. In this embodiment, the lock housing consists of two sections, lock section 74 and triple clamp section 76. Lock 12 is permanently secured to triple clamp 78 by threaded fastener 36, which is inserted through lock section 74 and into triple clamp section 76 to secure the two sections of lock 12.

In FIGS. 7 (perspective view) and 8 (cross sectional view), the locking device additionally performs the function of a seat stem clamp 80 with threaded fastener 82 securing clamp 80 to bicycle frame 84 and preventing seat post 86 from being loosened and stolen.

There are various possibilities with regard to size, shape and parts of the device. Lock mechanism 42 may consist of a key operated lock cylinder or a combination lock or other type of locking mechanism with an active locking element. Cable 50 may alternatively be a lever, arm or other flexible or jointed member. I contemplate that the lock housing be made of a zinc alloy, but other materials are also suitable.

ADVANTAGES

From the description above, a number of advantages of some embodiments of my lock become evident:

a) Lock 12 is permanently attached to handlebar 10 by means of fasteners which cannot be accessed when locking pin 56 is locked by plunger 44.

b) The lock is available for use at all times at the motorcycle, and the motorcyclist need not carry a separate, heavy or cumbersome chain or cable lock accessory. Further the fact that the lock is not carried on the person of the motorcyclist increases safety and reduces the likelihood in an accident of the lock being injuriously trapped between the rider and the road or other point of impact. No parts other than key need be carried on the body of the user or stored on the motorcycle in panniers.

c) This arrangement secures the helmet by looping the cable through the face of the helmet, providing a greater degree of security than D ring buckle locks, where the helmet strap is easily cut and the helmet stolen.

d) The lock incorporates a cable, so that the motorcyclist does not need to attach the cable each time the lock is used.

e) The lock can be attached to the length of the handlebar, rather than at the end of the handlebar, so that the weight of the complete device is carried relatively inboard and, further, avoids making the motorcycle wider and more cumbersome and potentially less safe.

f) The lock requires no modification to the helmet and may be used with any full-face helmet.

CONCLUSION, RAMIFICATIONS, AND SCOPE

Accordingly, the reader will see that at least one embodiment provides a lock that is securely and permanently attached to the handlebar by means of fasteners which cannot be accessed due to the way in which the plunger acts to prevent access to the fastener. In addition, the lock incorporates a compact, coiled cable that loops through the face of the helmet to secure the helmet, and thus relieves the motorcyclist from carrying and attaching a separate cable. Furthermore, the lock has the additional advantages in that it

- does not increase the width of the motorcycle, avoiding the reduced safety of a wider vehicle;
- is available for use at all times, without being carried by the rider as an accessory;
- provides stronger security than a D ring lock since the helmet strap is not relied on for security and is therefore not vulnerable to being cut by a thief;
- is attached to the length of the handlebar, rather than the ends, so that the weight is carried relatively in board;
- requires no modification to the helmet;
- may be attached to an item which itself is to be secured to a fixed item; and
- may incorporate other functions, for example the device may also act as a bicycle seat stem clamp.

Although the description above contains many specificities, these should not be construed as limiting the scope of the embodiment but merely as providing illustrations of some of the presently preferred embodiments. For example, the lock housing can have other shapes for engineering or aesthetic considerations or omit the concave frame which helps secure the coiled cable when the lock is not in use; the cable need not be pre coiled; the lock may be integrated into handlebar; the cable may be replaced by a lever or shaft; the device can incorporate an alarm, or be connected to an alarm system as further deterrent to theft of the locked item.

Thus the scope of the embodiment should be determined by the appended claims and their legal equivalents, rather than by the examples given.

I claim:

1. A locking device, comprising:
   a. a lock housing shaped in part to form a concave arc and formed of two or more mating sections, having a lock section and one or more supplementary sections, which are secured together to or around an object,
   b. a cable receiving bore extending into said lock section,
   c. a fastener receiving bore aligned with and extending said cable receiving bore through said lock section and into said supplementary sections,
   d. a threaded fastener for fixedly attaching all said sections of said lock housing to or around said object,
   e. a lock mechanism that is mounted in said lock section and incorporates an active locking element,
   f. a flexible cable having plural permanently formed spiral convolutions formed therein to reduce the length of said cable that is permanently secured at one end to said lock section, and
   g. a passive plug-in element that is secured to the other end of said cable and is adapted to enter said cable receiving bore and to releasably interlock therein with said active locking element,
whereby said cable is partially held in place by said concave arc of said lock housing, and forms a closed retaining loop, and said active locking element acts both to secure said cable in said lock housing and to deny access to said fastener so as to resist removal of said locking device from said object.

2. The locking device of claim 1 wherein said object is a motorcycle handlebar.

3. The locking device of claim 1 wherein one of said supplementary sections is incorporated in and part of a motorcycle handlebar, motorcycle triple clamp, bicycle frame or bicycle seat post clamp.

4. A method of securely attaching a lock to an item to be locked to an object, comprising:
   a. providing a lock housing shaped in part to form a concave arc and formed of two or more mating sections, having a lock section and one or more supplementary sections,
   b. providing a cable receiving bore extending into said lock section,
   c. providing a fastener receiving bore aligned with and extending said cable receiving bore through said lock section and into said supplementary sections,
   d. providing a threaded fastener,
   e. inserting said threaded fastener through said cable receiving bore and securing said threaded fastener into said fastener receiving bore,
   f. providing a lock mechanism that is mounted in said lock section and incorporates an active locking element,
   g. providing a flexible cable having plural permanently formed spiral convolutions formed therein to reduce the length of said cable that is permanently secured at one end to said lock section,
   h. providing a passive plug-in element that is secured to the other end of said cable, and
   i. inserting said passive plug-in element into said cable receiving bore to releasably interlock therein with said active locking element,
whereby said cable is partially held in place by said concave arc of said lock housing, and said active locking element acts both to secure said cable in said lock housing and denies access to said fastener so as to resist removal of said locking device from said item to be locked.

5. The method of claim 4 wherein said object is a motorcycle handlebar.

6. The method of claim 4 wherein one of said supplementary sections is incorporated in and part of a motorcycle handlebar, motorcycle triple clamp, bicycle frame or bicycle seat post clamp.

7. A locking device, comprising:
   a. a lock housing shaped in part to form a concave arc and formed of two or more mating sections, having a lock section and one or more supplementary sections, which are secured together to or around an object,
   b. a cable receiving bore extending into said lock section,
   c. a fastener receiving bore aligned with and extending said cable receiving bore through said lock section and into said supplementary sections,
   d. a threaded fastener for fixedly attaching all said sections of said lock housing to or around said object,
   e. a flexible cable having plural permanently formed spiral convolutions formed therein to reduce the length of said cable that is permanently secured at one end to said lock section,
   f. a passive plug-in element that is secured to the other end of said cable and is adapted to enter said cable receiving bore, and
   g. locking means housed within said lock section for releasably locking said passive plug-in element within said cable receiving bore,
whereby said cable is partially held in place by said concave arc of said lock housing, and forms a closed retaining loop, and said locking means acts both to secure said cable in said lock housing and to deny access to said fastener so as to resist removal of said locking device from said object.

8. The locking device of claim 7 wherein said object is a motorcycle handlebar.

* * * * *